Jan. 30, 1962    R. E. HERSHBERGER    3,018,782
CAR TOP SLEEPER
Filed Aug. 31, 1959    2 Sheets-Sheet 1
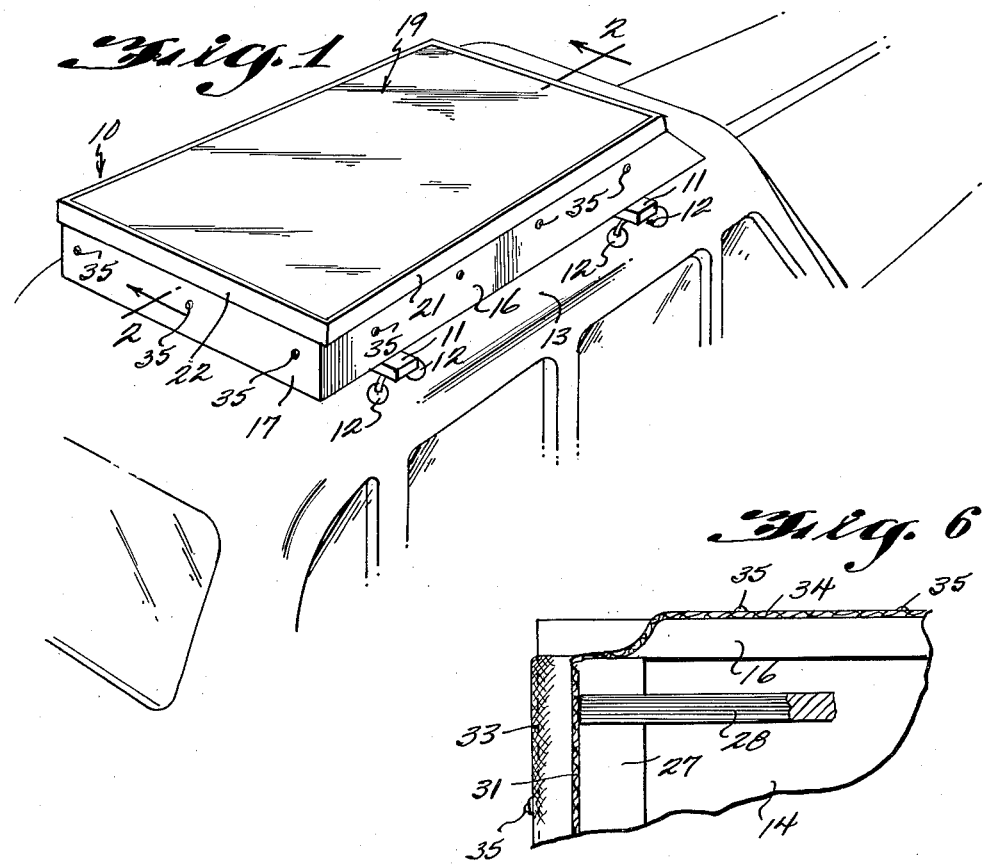
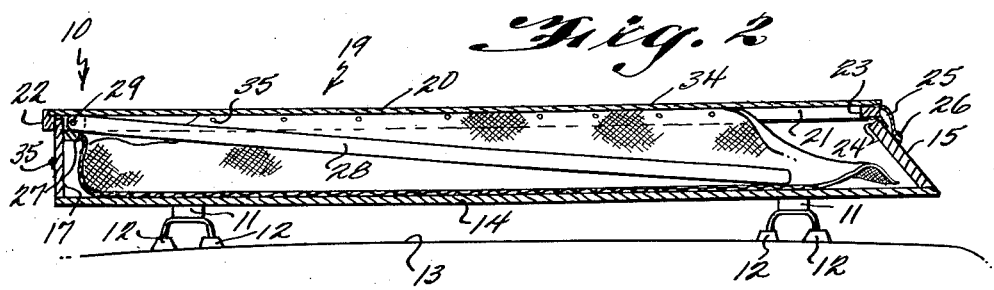
Inventor
ROMAN E. HERSHBERGER
By
Kimmel & Crowell
ATTORNEYS Jan. 30, 1962    R. E. HERSHBERGER    3,018,782
CAR TOP SLEEPER
Filed Aug. 31, 1959    2 Sheets-Sheet 2
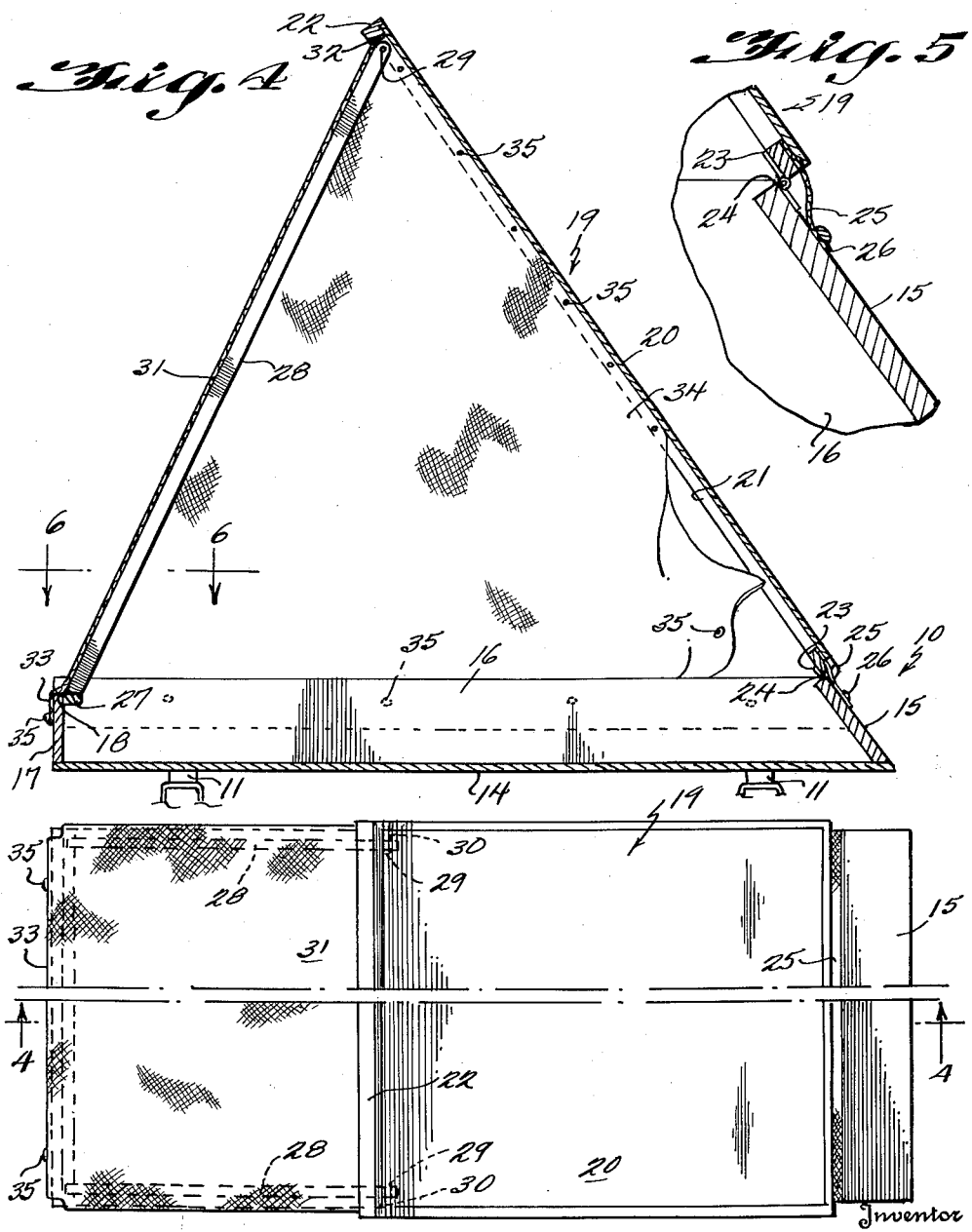
Inventor
ROMAN E. HERSHBERGER
By
Kimmel & Crowell
ATTORNEYS

United States Patent Office 3,018,782
Patented Jan. 30, 1962

3,018,782
CAR TOP SLEEPER
Roman E. Hershberger, 111 S. 13th St.,
Fort Dodge, Iowa
Filed Aug. 31, 1959, Ser. No. 837,082
1 Claim. (Cl. 135—1)

The present invention relates to a car top sleeper and particularly to a collapsible car top sleeper.

The primary object of the invention is to provide a car top sleeper which can be collapsed into a relatively small package when moving the car from place to place.

Another object of the invention is to provide a car top sleeper of the class described above which is waterproof and which has ample head room for the occupants when dressing and undressing.

A still further object of the invention is to provide a car top sleeper which is light in weight and which can be attached and detached from the top of a motor vehicle with a minimum of effort.

Other objects and advantages will become apparent in the following specification when considered in light of the attached drawings, in which:

FIGURE 1 is a perspective view of the invention shown attached to a motor vehicle, which latter is partially broken away for convenience of illustration;

FIGURE 2 is an enlarged fragmentary vertical section taken along the line 2—2 of FIGURE 1, looking in the direction of the arrows;

FIGURE 3 is a fragmentary top plan view of the invention;

FIGURE 4 is a vertical sectional view taken along the line 4—4 of FIGURE 3, looking in the direction of the arrows;

FIGURE 5 is an enlarged detail sectional view similar to FIGURE 4; and

FIGURE 6 is an enlarged fragmentary horizontal section taken along the line 6—6 of FIGURE 4, looking in the direction of the arrows.

Referring now to the drawings in detail wherein like reference characters indicate like parts throughout the several figures, the reference numeral 10 indicates generally a car top sleeper constructed in accordance with the invention.

The car top sleeper 10 includes a pair of transverse support bars 11 with each of the opposite ends thereof supported on a pair of suction cups 12 which are adapted to be mounted on a car top 13 and constitute a conventional car type carrier for which any other conventional car top carrier may be substituted. A generally horizontal bottom 14 is supported on the transverse bars 11 and is of generally rectangular form. A front wall 15 has its lower edge secured to the forward edge of the bottom 14 and slopes upwardly and rearwardly therefrom. A pair of spaced parallel side walls 16 extend upwardly from opposite side edges of the bottom 14 and rearwardly from the opposite side edges of the front wall 15. A rear wall 17 connects the rear edges of the side walls 16 and is supported on the rear edge of the bottom 14. The rear wall 17 terminates at 18 below the top edges of the side walls 16.

The bottom 14, front wall 15, side walls 16 and rear wall 17 form an open top box of a generally waterproof nature. A cover, generally indicated at 19, includes a relatively flat generally rectangular panel 20 having flanges 21 depending vertically from opposite sides thereof and a flange 22 depending vertically from the rear edge thereof. A cleat 23 depends vertically from the forward edge of the panel 20 to form with the flanges 21, 22 a generally rectangular frame depending from the panel 20. A pair of hinges 24 secures the forward edge of the cover 19 to the upper end portion of the upwardly and rear-wardly sloping front wall 15, mounting the cover 19 so that it may hinge from a closed position, as illustrated in FIGURES 1 and 2, to an open position, as illustrated in FIGURES 3 and 4.

The flanges 21 engage over the sides 16 and the flange 22 engages over the rear wall 17 when the cover 19 is closed. A flexible waterproof seal 25 is secured to the upper end portion of the front wall 15 by a molding strip 26. The seal 25 has its opposite end portion secured to the underside of the forward edge of the panel 20 by the cleat 23 so that the joint between the cover 19 and the front wall 15 is waterproof.

A transversely extending bar 27 extends between the side walls 16 in engagement with the top edge 18 of the rear wall 17, for a purpose to be later stated.

A pair of elongated relatively straight braces 28 is pivotally secured to the respective flanges 21 by means of pivot pins 29. A spacer block 30 maintains the braces 28 at one end in spaced relation to the flanges 21. The pivots pins 29 have their axes parallel to the flange 22 and are positioned closely adjacent thereto. The braces 28 can be swung from a position underlying the cover 19, as shown in FIGURE 2, to a position supporting the cover 19 with the free ends thereof resting on the bar 27, as shown in FIGURE 4.

A generally rectangular canvas panel 31 has an edge thereof sealed at 32 under the flange 22. The opposite lower edge 33 of the canvas panel 31 overlaps the outer surface of the rear wall 17. The side edges of the canvas panel 31 are supported by the braces 28 with the cover 19 in erected position, as shown in FIGURE 4. Triangular panels 34 are integrally formed with the rectangular panel 31 on the opposite sides of the latter and are adapted to have their free lateral sides secured to the inner surface of the flanges 21 by a plurality of snaps 35. The lower edge 33 of the panel 31 is likewise secured by snaps 35 to the rear wall 17. The base sides of the triangular panels 34 are positioned in overlying relation to the respective side walls 16 and are similarly secured thereto by a plurality of snaps 35.

In the use and operation of the invention, the canvas panel 31 has its upper edge permanently affixed to the cover 19 and its lower edge detachably affixed to the rear wall 17 with the triangular panels 34 detachably connected to the flanges 21 and to the side walls 16. The cover 19 is swung upwardly to the position illustrated in FIGURE 4, and the braces 28 are swung rearwardly into contact with the canvas panel 31 with their lower ends resting on the bar 27 to maintain the canvas panel 31 taut and to maintain the cover 19 in erected position.

The bottom 14 can be used to support a sleeping bag, inflated mattress or a conventional spring and mattress so that the user may sleep comfortably thereon protected from the elements by the cover 19 and the canvas 31. One of the triangular panels 34 is unsnapped to permit entrance and exit for the sleeper.

It should be understood also that other building materials such as steel, aluminum, etc., may be used in constructing the car top sleeper without departing from the scope of the appended claims.

Having thus described the preferred embodiment of the invention, it should be understood that numerous structural modifications and adaptations may be resorted to without departing from the scope of the appended claim.

What is claimed:

A car top sleeper comprising an open top box, including a bottom, side walls, and front and rear walls, attachment means positioned in aligned spaced relation along said side and rear walls, a pair of transversely positioned supporting bars secured to said bottom for mounting the box on a car top, suction cups at the opposite ends of said supporting bars for holding the latter in place on the car top, a cover having side flanges and a flange at one end and pivotally attached at the other end to the front wall of the box and swingable from a position closing the top of the box to an elevated position extending upwardly at an angle thereto, a waterproof seal between the latter end of said cover and the front wall of the box, attachment means positioned in aligned spaced relation on the side flanges of said cover, a pair of braces pivotally secured on the opposite sides of said cover and adjacent the flange on the end of the latter and adapted to rest with their free ends on the rear wall of the box to hold the cover in the elevated position, a flexible waterproof canvas panel formed in three parts including a rectangular center section secured at its top by a waterproof joint to the flange at the first end of the cover and adapted to be positioned across the braces and secured at its bottom to the rear wall of the box by the attachment means on the latter, and triangular sections each integral along one lateral side with the respective side of the center section and adapted to be secured on their other lateral sides to the respective side flanges of the cover by the atttachment means on the latter and on their base sides to the sides of the box by the attachment means on the latter.

References Cited in the file of this patent

UNITED STATES PATENTS

| | | |
|---|---|---|
| 851,141 | Stempel | Apr. 23, 1907 |
| 2,222,636 | Strauss | Nov. 26, 1940 |
| 2,259,267 | Ranken | Oct. 14, 1941 |
| 2,291,900 | Jimmes | Aug. 4, 1942 |